Patented Apr. 20, 1926.

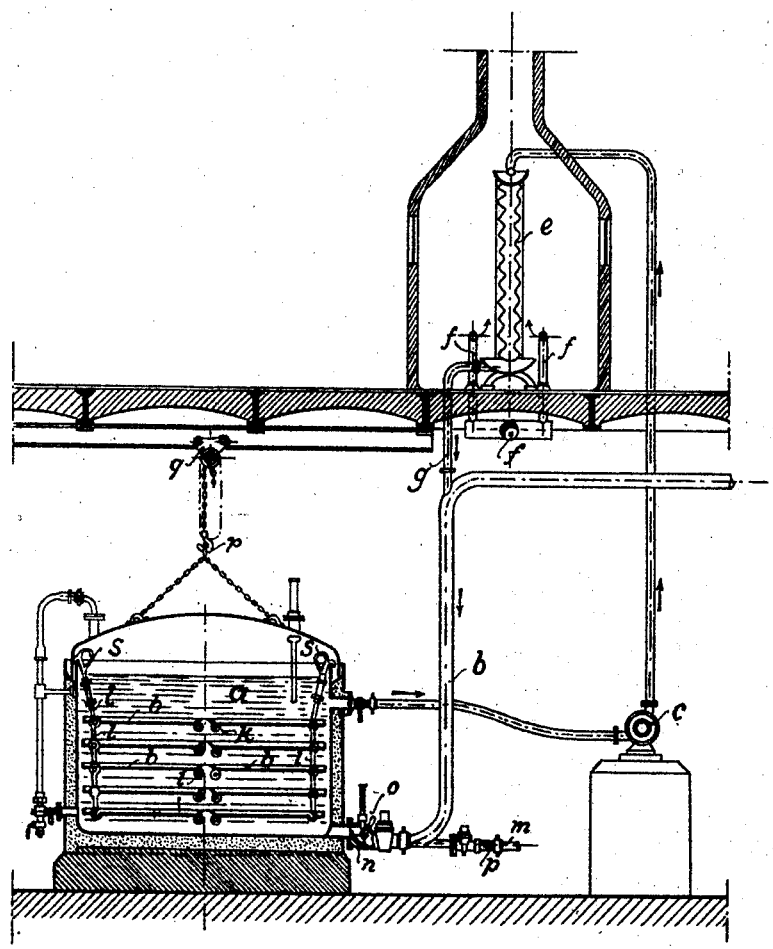

1,581,194

UNITED STATES PATENT OFFICE.

AUGUST GILLE AND LEOPOLD NATHAN, OF ZURICH, SWITZERLAND, ASSIGNORS TO THE CORPORATION OF NATHAN INSTITUT A.-G., OF ZURICH, SWITZERLAND.

APPARATUS FOR COOLING AND AERATING BEER WORT AND FOR DEPOSITING THE SLUDGE.

Application filed August 27, 1921. Serial No. 495,965.

*To all whom it may concern:*

Be it known that we, AUGUST GILLE and LEOPOLD NATHAN, citizens of the German Republic and Switzerland, respectively, and both residents of Zurich, Switzerland, have invented new and useful Improvements in Apparatus for Cooling and Aerating Beer Wort and for Depositing the Sludge (for which we have filed an application in Germany on June 19, 1920), of which the following is a specification.

This invention relates to improvements in the sterile system of brewing and more particularly to the system, wherein the common cooling vat is replaced by a closed vessel containing a plurality of superimposed plates, on which the sludge is deposited.

The improvements consist in the general arrangement of the said depositing vessel and a cooling device, which is provided with means to aerate the wort while passing over the cooling surfaces, and in the specific features hereinafter set forth.

The drawing shows a sectional view of the apparatus.

A vessel $a$ serves to receive hot wort discharged from the copper (not shown), said wort entering the vessel $a$ by way of a pipe $b$ and sterilizing it completely. A pump $c$ takes the hot wort from an outlet at the upper portion of the vessel $a$ (which outlet is separate from the inlet $h$) and delivers such hot wort to a surface cooler $e$, which may be of any desired construction and is situated in an enclosed chamber supplied with sterilized air through a pipe $f$.

The air passes over the cooler takes away the vapours developed thereon from the wort and carries them off by an opening at the top of the chamber. The cooled wort flows through a pipe $g$ back into a vessel $a$, in which the deposition of the sludge then takes place.

The vessel $a$ is surrounded by heat-insulated material to keep the wort cool during the depositing process.

Depositing plates $h$ are placed inside the vessel $a$. Each of the plates $h$ is divided in the middle and each part is supported at its inner end by means of pivots $i$ in bearings $k$ in the side of the vessel $a$; and at its outer end by means of jointed rods $l$. The plates are provided each with an upstanding marginal rim in order that the deposited sludge may be prevented from running down during the discharge of the wort.

The cooled and clarified wort is conveyed, through a pipe $m$, to the fermentation vessels (not shown), a pivoted segmental member $n$ being adjusted by a lever $o$ in such a manner as to prevent the sludge deposited on the bottom of the vessel $a$ from running away at the same time. It is not until the wort has drained away as fas as the level of the segmental member $n$ that the latter is lowered by means of the lever $o$ until all the clear wort has been run off, which can be observed through an observation window $p$. After removing the cover of vessel $a$, by means of lifting tackle $q$ and hook $r$, suitable chains are run from said hook $r$ to the eyes $s$ of the jointed rods $l$, whereby the outer edges of the plates $h$ may be raised by lifting tackle $q$, so that the sludge deposited on the plates runs down and collects at the bottom of the vessel $a$, from which it can be discharged, through the bottom cock, after the segmental member $n$ has been correspondingly adjusted, and can be further treated for the recovery of the wort contained. The eyes $s$ of the uppermost rods $l$ have hooks to engage the upper edge of the vessel $a$ proper, to support the plates $h$ in their normal position. After removing the detachable cover of said vessel, the plates $h$ can be lifted out; in order to clean them thoroughly.

Owing to the fact that the inlet of the vessel $a$ is separated from its outlet connected (through the pump $c$) with the inlet of the cooler $e$, I am enabled to circulate the wort through a continuous or closed path including said vessel and said cooler, and thus to effect the cooling of the wort and the removal of vapors in cooler $e$ at the same time that the deposit of sludge goes on in vessel $a$.

Now what we claim and desire to secure by Letters Patent is the following:

1. In an apparatus of the class described, a sludge depositing vessel provided with sludge-receiving plates, the adjacent ends of which are pivoted while their other ends are free to be raised and lowered so as to swing said plates on their pivots.

2. In an apparatus of the class described, a sludge depositing vessel having plates arranged in superposed pairs, the two plates of each pair being pivoted at their adjacent ends and a lifting device located above said vessel and adapted for connection with the other ends of said plates to move such ends up or down and swing the plates on their pivots.

3. In an apparatus of the class described, a sludge depositing vessel provided with plates arranged in superposed pairs, the plates of the same pair being pivoted at their adjacent ends and movable jointed rods connecting the superposed plates at their other ends to swing said superposed plates on their respective pivots in unison.

4. In an apparatus of the class described, a sludge depositing vessel having sludge depositing plates arranged in superposed pairs, the plates of the same pair being pivoted to said vessel at their adjacent ends, rods movable up and down and connecting the superposed plates to swing them on their respective pivots, the upper ends of said rods having means to engage the upper portion of the vessel and to be supported thereon, and a removable cover for said vessel.

5. In apparatus of the class described, a sludge depositing vessel having a plurality of superposed deposit collecting plates, pivoted about axes located at different levels, and means whereby such plates may be swung on their pivots.

6. In apparatus of the class described, a sludge depositing vessel having an outlet and a discharge controlling member located at said outlet and adjustable up and down to control the separation of sludge from the clear liquid and allow the sludge to be withdrawn after the clear liquid has passed out, said vessel also having a second outlet and an inlet, in combination with a cooler, the inlet of which is connected with the second outlet of said vessel and the outlet of which is connected with the inlet of said vessel, whereby a continuous circulation path is afforded.

7. In apparatus of the class described, a sludge depositing vessel provided with an outlet and a pivoted discharge controlling device located at said outlet and operated from the outside of the vessel to allow the clear liquid to be withdrawn, first from the vessel, and then to adjust the said discharge controlling device to a lower position for the purpose of allowing the collected sludge to be discharged, said vessel also having a second outlet and an inlet, in combination with a cooler, the inlet of which is connected with the second outlet of said vessel and the outlet of which is connected with the inlet of said vessel, whereby a continuous circulation path is afforded.

8. In apparatus of the class described, a sludge depositing vessel having a plurality of superposed deposit collecting plates, in combination with a cooler separate from said vessel, conduits connecting said cooler with the upper and lower portions of said vessel respectively, and means for circulating liquid from said vessel to the cooler and back to the vessel.

9. In apparatus of the class described, a sludge depositing vessel having a plurality of superposed deposit collecting plates, the edges of which are spaced from the walls of the vessel to leave room for the vertical passage of the liquid, in combination with a cooler separate from said vessel, conduits connecting said cooler with the upper and lower portions of said vessel, means to circulate the liquid from the upper part of said vessel to the cooler and back from the cooler to the lower part of the vessel, and means to remove the deposited sludge from the plates.

We claim the foregoing as our invention, we have signed our names this 28th day of July, 1921 and 8th day of August, 1921.

AUGUST GILLE.
LEOPOLD NATHAN.